United States Patent
Hale

(10) Patent No.: US 9,830,478 B1
(45) Date of Patent: Nov. 28, 2017

(54) LOGGING FROM OBFUSCATED CODE

(71) Applicant: Semmle Limited, Oxford (GB)

(72) Inventor: Joshua George Hale, Oxford (GB)

(73) Assignee: Semmle Limited, Oxford (GB)

( * ) Notice: Subject to any disclaimer, the term of this patent is extended or adjusted under 35 U.S.C. 154(b) by 59 days.

(21) Appl. No.: 14/803,591

(22) Filed: Jul. 20, 2015

(51) Int. Cl.
- *G06F 21/71* (2013.01)
- *G06F 9/44* (2006.01)
- *G06F 21/14* (2013.01)

(52) U.S. Cl.
CPC ............... *G06F 21/71* (2013.01); *G06F 8/70* (2013.01); *G06F 21/14* (2013.01); *G06F 2221/0748* (2013.01)

(58) Field of Classification Search
CPC ............ G06F 21/71; G06F 8/70; G06F 21/14
See application file for complete search history.

(56) References Cited

U.S. PATENT DOCUMENTS

| | | | | |
|---|---|---|---|---|
| 5,928,369 | A * | 7/1999 | Keyser | G06F 11/0766 714/47.3 |
| 8,108,689 | B2 | 1/2012 | Nicolson et al. | |
| 8,806,641 | B1 * | 8/2014 | Li | G06F 21/564 717/174 |
| 8,824,684 | B2 | 9/2014 | Calcaterra et al. | |
| 8,862,537 | B1 | 10/2014 | Kurtic et al. | |
| 8,949,660 | B1 * | 2/2015 | Pupius | G06F 11/36 714/4.4 |
| 9,213,841 | B2 | 12/2015 | Hiar et al. | |
| 2006/0253837 | A1 * | 11/2006 | Hudson | G06F 11/366 717/124 |
| 2009/0119515 | A1 * | 5/2009 | Nicolson | G06F 21/14 713/190 |
| 2009/0300774 | A1 * | 12/2009 | Makkinejad | G06F 21/629 726/27 |
| 2009/0313269 | A1 * | 12/2009 | Bachmann | G06F 21/645 |
| 2010/0211932 | A1 * | 8/2010 | Jones | G06F 11/3624 717/124 |
| 2013/0104239 | A1 * | 4/2013 | McLachlan | G06F 21/54 726/26 |
| 2014/0310679 | A1 | 10/2014 | Bhattacharya et al. | |
| 2015/0347220 | A1 * | 12/2015 | Hermany | G06F 11/0742 714/48 |
| 2016/0274997 | A1 * | 9/2016 | Kachko | G06F 11/366 |

* cited by examiner

*Primary Examiner* — Carl Colin
*Assistant Examiner* — Vance Little
(74) *Attorney, Agent, or Firm* — Fish & Richardson P.C.

(57) ABSTRACT

Methods, systems, and apparatus, including computer programs encoded on computer storage media, for receiving an encrypted version of an obfuscated stack trace representing an error generated by error handling code of obfuscated code executed by a user device, the obfuscated stack trace having obfuscated code element names corresponding to deobfuscated code element names in a deobfuscated version of the code; decrypting the encrypted stack trace to generate an obfuscated stack trace; receiving an encrypted obfuscation log that maps obfuscated code element names of the obfuscated code executed by the user device to deobfuscated code element names in the deobfuscated version of the code; decrypting the encrypted obfuscation log to generate a decrypted obfuscation log; and generating a deobfuscated stack trace using the decrypted obfuscation log, the deobfuscated stack trace having deobfuscated code element names.

34 Claims, 6 Drawing Sheets

```
public class Class_a {    ← 502
    int a, b;
    String c, d;    ← 504
    .
    .
    .
    private Class_b A (int x, int y) {    ← 506
        int a, b;
        .
        .
        .
        return Class_b_object;
    }
    public void B (Class_b x) {    ← 508
        int a, b;
        .
        .
        .
    }
    .
    .
    .
}
```

LOGGING FROM OBFUSCATED CODE

BACKGROUND

This specification relates to logging from obfuscated code.

Stack traces are a type of logging typically used during debugging. Stack traces provide a report of a call stack at a particular point during execution of a program. Each element in the stack trace corresponds to an element in the call stack. When a stack trace is reported, the report typically includes the specific file and line number of the point in source code associated with the element in the call stack corresponding to each stack trace element. This is normally accompanied by the name of a called function name, and may include parameters and variables in scope at the point of call. If the stack trace arises from the throwing of an exception, the report may also display information added to the exception at the point of its creation, such as its type and an associated message.

Programmers can deliberately obfuscate code, e.g., source code or byte code, using a code obfuscator, thereby making the code difficult for humans to understand. In general, this entails renaming almost all symbols within the program, e.g., type names, function names, field names, etc. The renaming is applied in a consistent manner so that the behaviour of the program is not affected. The renaming is typically performed in a semi-random fashion that renders the code incomprehensible to humans. Obfuscation is an important tool for the protection of proprietary software, as it severely impedes the reverse engineering of software.

Stack traces are an important tool in the development and debugging of software, but stack traces generated within obfuscated code can be difficult to comprehend because the function and variable names reported in the stack trace do not correspond to the original function and variable names in the source code that developers work with directly.

SUMMARY

This specification describes a system for deobfuscating obfuscated stack traces that arise within obfuscated code. The system can also generate mnemonic stack-trace hashes from stack traces, e.g., the obfuscated stack traces. The system can generate automatic notifications when the mnemonic stack-trace hashes have occurred before.

In general, one innovative aspect of the subject matter described in this specification can be embodied in methods that include the actions of receiving an encrypted version of an obfuscated stack trace representing an error generated by error handling code of obfuscated code executed by a user device, the obfuscated stack trace having obfuscated code element names corresponding to deobfuscated code element names in a deobfuscated version of the code; decrypting the encrypted stack trace to generate an obfuscated stack trace; receiving an encrypted obfuscation log that maps obfuscated code element names of the obfuscated code executed by the user device to deobfuscated code element names in the deobfuscated version of the code; decrypting the encrypted obfuscation log to generate a decrypted obfuscation log; and generating a deobfuscated stack trace using the decrypted obfuscation log, the deobfuscated stack trace having deobfuscated code element names.

Implementations can include one or more of the following features. The obfuscated code is generated by an obfuscator that generates different code element names each time the obfuscator is run. Receiving a first mnemonic stack-trace hash generated by the user device based on one or more properties of obfuscated code element names referenced by the obfuscated stack trace; generating a signature for the deobfuscated stack trace based on one or more properties of deobfuscated code element names referenced by the deobfuscated stack trace; generating a second mnemonic stack-trace hash from the signature for the deobfuscated stack trace; comparing the first mnemonic stack-trace hash to the second mnemonic stack-trace hash; and generating an automatic notification based on the comparison. The automatic notification includes the first or the second mnemonic stack-trace hash, the method further comprising: identifying, from a database that associates developer contact information with mnemonic stack-trace hashes, a developer contact corresponding to the first or the second mnemonic stack-trace hash; and sending the notification to the developer contact. Sending the automatic notification to the user device, the automatic notification comprising executable instructions that cause the user device to display a user interface including the automatic notification.

Another innovative aspect of the includes receiving, by error handling code of a project having obfuscated code being executed by a user device, an obfuscated stack trace, the obfuscated stack trace having obfuscated code element names; generating a signature for the obfuscated stack trace based on one or more properties of obfuscated code element names referenced by the obfuscated stack trace; generating a mnemonic stack-trace hash from the signature for the obfuscated stack trace, the mnemonic stack-trace hash being a sequence of terms in a natural language; and presenting, to a user of the user device, the mnemonic stack-trace hash.

Implementations can include one or more of the following. The obfuscated code has a plurality of methods and a plurality of classes, where generating the signature comprises: generating, for each class referenced by the obfuscated stack trace, a class signature based at least on a number of methods in the respective class; generating, for each method of each class referenced by the obfuscated stack trace, a method signature based at least on a number of parameters to the respective method; generating, for each method of each class referenced by the obfuscated stack trace, a first refined method signature based at least on the respective method signature and the respective class signature; and generating the signature for the obfuscated stack trace based at least on respective first refined method signatures of the one or more methods identified in the stack trace. Generating, for each class, a refined class signature based at least on respective first refined method signatures of methods within the class and the respective class signature, and where the stack trace signature is based at least on the respective refined class signatures of the one or more classes identified in the stack trace. Identifying one or more methods having a return type or argument types associated with any generated signatures; generating, for each of the one or more methods having a return type or argument types associated with any generated signatures, a second refined method signature based at least on the any associated generated signatures and the respective first refined method signature. The return type for each of the one or more methods is one of the following: a void return type, a primitive return type, or a class return type. Generating, for each method, the first refined method signature comprises concatenating the respective method signature and the respective class signature. Each class signature is based at least on one or more of the following properties in the respective class: a number of fields, a number of qualifiers, a number of static variables, and a number of string constants. Generating the mnemonic stack-trace hash comprises: identifying a fixed number of categories, each category comprising a plurality of distinct single words; generating a cryptographic hash from the signature; generating a number of segments from the cryptographic hash, the number of segments equal to the fixed number of categories, each segment having a value corresponding to a respective category; selecting a single word from each category based on the respective segment value; and generating the mnemonic stack-trace hash based at least on the selected single word from each category. Comparing the mnemonic stack-trace hash with previously stored mnemonic stack-trace hashes; and generating an automatic notification if the mnemonic stack-trace hash has occurred before. Receiving updated obfuscated code, the updated code having different obfuscated code; generating an updated obfuscated stack trace from executing the updated obfuscated code; generating an updated signature from the updated obfuscated stack trace; generating an updated mnemonic stack-trace hash from the updated signature; determining the updated mnemonic stack-trace hash matches the mnemonic stack-trace hash; and generating an automatic notification indicating that the mnemonic stack-trace hash has occurred before. Generating a signature for the obfuscated stack trace comprises generating the signature without having access to the deobfuscated stack trace. Generating a signature for the obfuscated stack trace comprises generating the signature without having access to the deobfuscated code element names.

Another innovative aspect includes receiving, from a user device, a first mnemonic stack-trace hash generated by error handling code of a project having obfuscated code, wherein the first mnemonic stack-trace hash represents an obfuscated stack trace, the obfuscated stack trace having obfuscated code element names, the first mnemonic stack-trace hash being a sequence of terms in a natural language; receiving, for each of a plurality of stack traces corresponding to known bugs in a project, a respective mnemonic stack-trace hash from a signature of the stack trace; determining that the first mnemonic stack-trace hash matches one of the mnemonic stack-trace hashes for the plurality of stack traces; and generating an automatic notification that the first mnemonic stack-trace hash has occurred before.

Implementations can include one or more of the following features. Each stack trace in the plurality of stack traces is generated from obfuscated code. Each stack trace in the plurality of stack traces is generated from deobfuscated code. The first sequence is received from a second different client having a different version of the obfuscated code. The automatic notification includes the second mnemonic stack-trace hash, the method further comprising: identifying, from a database that associates developer contact information with mnemonic stack-trace hashes, a developer contact corresponding to the second mnemonic stack-trace hash; and sending the notification to the developer contact. Sending the automatic notification to the user device, the automatic notification comprising executable instructions that cause the user device to display a user interface including the automatic notification.

The foregoing and other embodiments can each optionally include one or more of the following features, alone or in combination. In particular, one embodiment may include all the following features in combination.

Particular embodiments of the subject matter described in this specification can be implemented so as to realize one or more of the following advantages. Code that is obfuscated by a vendor and installed at a client system can be securely deobfuscated at the vendor system. Obfuscated stack traces generated from obfuscated code can be deobfuscated, thereby gaining security without sacrificing ease of debugging. Obfuscated stack traces can be passed securely from the client system to the vendor system, and therefore can include sensitive client information without exposing that information.

Stack traces can be hashed to a sequence of terms, occurrences of which can indicate a frequency that a particular error (with a unique stack trace) occurs. Stack traces are hashed in such a manner that it is extremely unlikely that two unique stack traces from the same program 'clash', i.e., yield the same hash. This allows errors to be uniquely identified. The hash can also be represented as a sequence of terms that is comprehensible and memorable, and can be used as a reference by users and developers of the software. A fundamental aspect of the system is that the hash representing a particular stack trace does not affect obfuscation. That is, the hash of the stack trace for a given point during the execution of a program is identical to that generated for the same point in an otherwise identical obfuscated program. Whether obfuscated or not, the same stack trace always generates the same sequence of terms. This allows tracking of errors that occur over multiple iterations of code, and allows developers to relate errors arising in obfuscated versions distributed to clients, to the same errors arising in the non-obfuscated code they work with. The sequence of terms provides an easy-to-remember name for a particular bug manifestation. The name aids client users who experience bugs, since they can quickly determine whether they are seeing the same or a different bug, and determine for themselves whether or not the effects are serious. Bug reporting, therefore, can be simplified because clients who can easily recognize the same bug are more likely to remember that they have already reported a bug and may be able to provide further information on how the bug manifests. The memorable handle also aids the filing and discoverability of information pertaining to particular bugs, e.g., it is significantly easier for a given user to discover information already filed about a particular bug since the simple memorable handles naturally lend themselves as string identifiers or tags. It likewise aids developers, who can quickly recognize particular bugs without having to inspect stack traces in detail, memorise considerable aspects of those stack traces, and compare them. Different stack traces often contain many identical elements at the upper levels of the call stack, and there is a cognitive burden associated with finding the aspects peculiar to a particular bug. It is also easy to confuse bugs with similar stack traces, so the association of unique memorable handle with each unique bug aids the accurate appraisal during debugging.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is an illustration of example code used to generate a signature.

Like reference numbers and designations in the various drawings indicate like elements.

DETAILED DESCRIPTION

Figure 1:
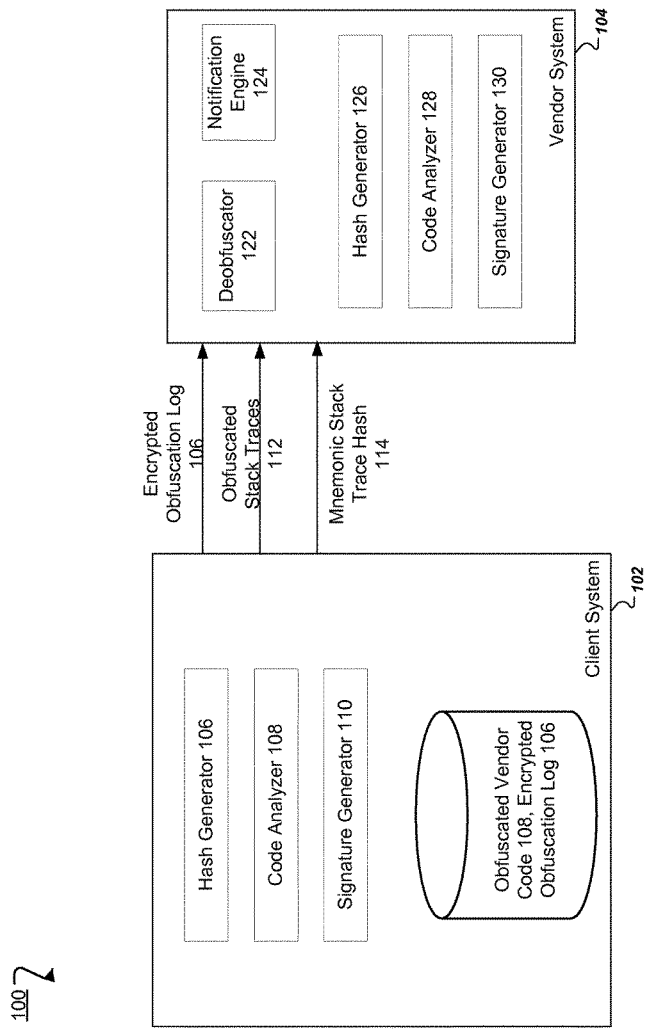
FIG. 1 shows an example architecture for generating logs from obfuscated code.

FIG. 1 shows an example system 100. The system includes a client system 102 in communication with a vendor system 104. The client system 102 and the vendor system 104 can communicate over a wide area network, e.g., the Internet. The client system 102 and the vendor system 104 each include multiple respective functional components that can be implemented as computer programs installed on one or more computers.

The vendor system 104 can maintain, e.g., through a code repository, code for a project to be executed on the client system 102. For example, the vendor system 104 can be part of a software development company, and the company can maintain and distribute code to client systems, e.g., over the Internet, or by physical delivery. The client system 102 can also receive the obfuscated code 108 in other ways. For example, the client system 102 can have the obfuscated code 108 installed as part of an operating system running on the client system 102. The client system 102 may alternatively receive the obfuscated code 108 through physical media, e.g., a CD-ROM.

The distributed code can be source code or byte code, which may be referred to in this specification as simply "code" for brevity. Source code generally refers to human-readable text that is compiled into an executable form or interpreted by an interpreter. Byte code on the other hand is an instruction set that is ready for execution, e.g., by an interpreter or a virtual machine. Nevertheless, byte code typically retains many of the symbol names employed in the source code from which it was derived, and may still be highly readable by human inspection, particularly by means of a so-called decompiler tools designed to invert the transformation from source code to byte code.

Thus, the vendor system 104 can obfuscate the code, e.g., using a code obfuscator, before the code is distributed to the client system 102. Some obfuscators used by the vendor system 104 can obfuscate the same code differently on each obfuscation run. In other words, the obfuscators can obfuscate randomly so that each obfuscation run is different. Randomised obfuscation is typically preferable, since it eliminates opportunities for establishing correlations between different versions.

When obfuscating the code, the vendor system 104 can generate an obfuscation log 106. That is, every time the code is obfuscated, the vendor system 104 can generate a corresponding obfuscation log because each time the code is obfuscated, different obfuscated code is generated. The obfuscation log 106 maps obfuscated code element names to original, deobfuscated, code element names. In some implementations, the code element names include method names, class names, file names, and variable names.

The obfuscation log is needed in order to deobfuscate messages that refer to obfuscated elements, e.g., stack traces produced by the client system 102. It is possible for the vendor to retain the appropriate obfuscation log given that it is known to the vendor which version of the software that the client is using. The vendor may have many different versions of the software, and it is a burden to keep track of the appropriate obfuscation logs. Instead the vendor system 104 encrypts the obfuscation log 106, and includes it as part of the software distributed to the client so that it forms part of the client system 102. In order to preserve the obfuscation of the code, the vendor system 104 encrypts the obfuscation log 106 before providing the obfuscation log to the client system 102, so that the decrypted obfuscation log is not accessible by the client. The obfuscation log 106 can be only provided to the client system 102 so that the client system 102 can provide the obfuscation log 106 back to the vendor system 104 along with stack traces 112 and a mnemonic stack trace hash 114, which will be described further below.

In some implementations, the vendor system 104 generates a public and private key pair and encrypts the obfuscation log 106 with the public key. The vendor system 104 can also provide the public key to the client system 102 along with the encrypted obfuscation log 106 and the obfuscated code 108. In some implementations, the vendor system 104 provides the obfuscated code 108, the obfuscation log 106, and the public key to the client system 102 as a packaged executable, e.g., as a Java Archive (JAR).

The public key can allow the client to send stack traces or other client data to the vendor system 104 that include sensitive information. Multiple clients can use the same public key, since each public key can encrypt but not decrypt.

In some implementations, the client system 102 is provided with a public key that is different from a public key used to encrypt the obfuscation log 106. The public key used to encrypt the obfuscation log 106 can be controlled by the vendor system 104. Therefore, the obfuscation log 106 can be accessible only by the vendor system 104.

The client system 102 executes the obfuscated code 108. The obfuscated code 108 implements several functional modules upon being executed, including a hash generator 116, a code analyzer 118, and a signature generator 110. These components will typically be invoked by error handling code of the obfuscated code 108.

Upon the client system 102 encountering one or more bugs in the obfuscated code 108, error handling code of the obfuscated code 108 generates one or more obfuscated stack traces 112, which are stack traces generated from the obfuscated code 108, and which include obfuscated code element names.

Stack traces can also be generated in response to performance monitoring code, e.g., self-monitored performance statistics. The stack traces, therefore, can contain messages that do not involve a bug.

The client system 102 may also encrypt the obfuscated stack traces 112 using the public key. Generally, even though stack traces 112 are already obfuscated, encrypting the stack traces 112 before they are sent over an external network, e.g., the Internet, adds an additional layer of security for the client system 102 because the stack trace may include sensitive data about the client system 102.

The client system 102 can then send the obfuscated stack traces 112 as well as the encrypted obfuscation log 106 to the vendor system 104 for deobfuscation and analysis. This will be described in more detail below with reference to FIG. 3.

The vendor system 104 receives the encrypted obfuscation log 106 and the encrypted obfuscated stack traces 112. The vendor system 104 can decrypt the obfuscation log 106 and the obfuscated stack traces 112 using a private key corresponding to the public key. A deobfuscator 122 at the vendor system 104 can deobfuscate the obfuscated stack traces 112 using the decrypted obfuscation log. Then, the vendor system 104 can then analyze the deobfuscated stack traces and generate a variety of automatic notifications using a notification engine 124. Automatic notifications will be described in more detail below with reference to FIG. 6.

In some implementations, the client system 102 generates a mnemonic stack-trace hash 114 from the obfuscated stack traces 112. In some implementations, the client system 102 uses a code analyzer 118, a signature generator 110, and a hash generator 116 to generate the mnemonic stack-trace hash 114. These components and generating the mnemonic stack-trace hash 114 will be described further below in reference to FIGS. 2, 4, and 5. The mnemonic stack-trace hash 114 can be a sequence of terms in a natural language, e.g., English, that is easy for a human to remember in order to aid customers and developers in debugging the project. For example, by referencing an easy-to-remember sequence of terms, developers at the vendor system 104 can interact with clients to determine when and why a particular bug occurs. This is true even if there may be collisions from the hashing, since it is very likely that by the time a collision occurs the collided sequence will no longer be relevant, e.g. because the original bug will have been fixed.

The client system 102 can send the mnemonic stack-trace hash 114 to the vendor system 104. In some implementations, the mnemonic stack-trace hash 114 is generated from the obfuscated stack traces 112 at the vendor system 104. In some implementations, the mnemonic stack-trace hash 114 is also encrypted using the public key.

The vendor system 104 can use an equivalent code analyzer 128, signature generator 130, and hash generator 126 to generate mnemonic stack-trace hashes for errors in the project. Notably, the vendor system 104 can generate mnemonic stack-trace hashes for errors arising in unobfuscated code of a project, and those mnemonic stack-trace hashes will match mnemonic stack-trace hashes generated from obfuscated code of the same project.

The vendor system 104 can compare the mnemonic stack-trace hashes generated by the vendor system with the mnemonic stack-trace hash 114 received from the client system 102. Upon finding a match, the vendor system 104 can generate an automatic notification using notification engine 124.

Figure 2:
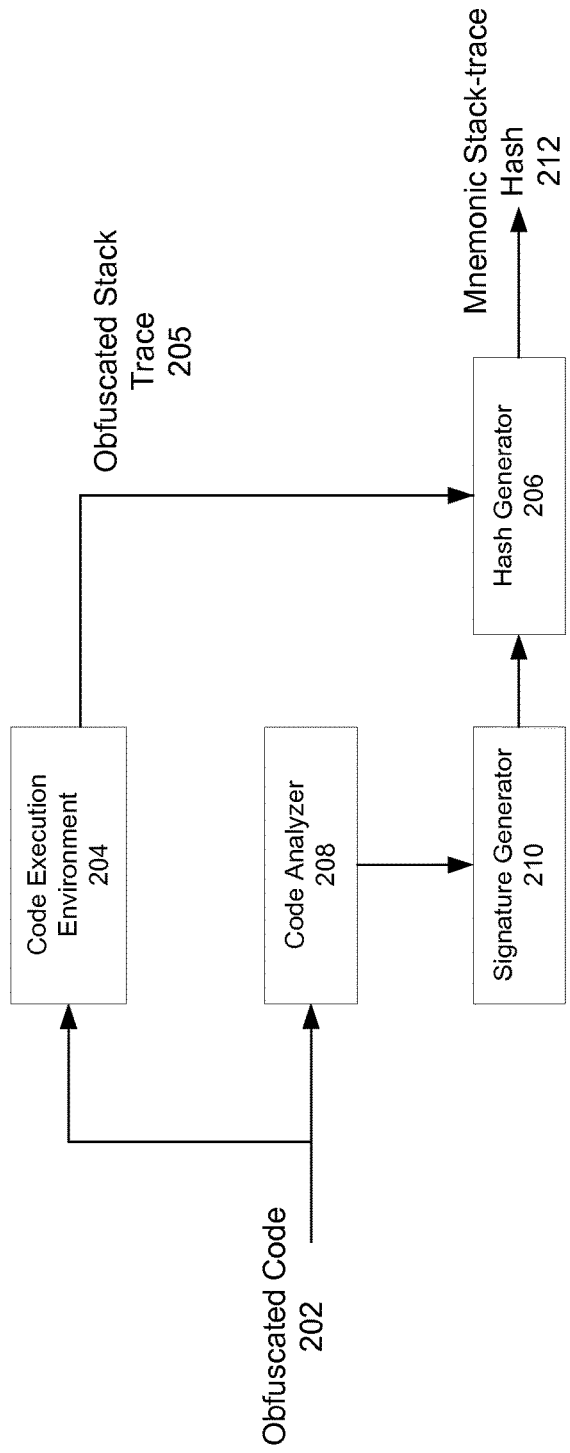
FIG. 2 is an example architecture for a client system that processes obfuscated code.

FIG. 2 is an example architecture 200 for a client system, e.g., client system 102 of FIG. 1, which executes obfuscated code. The client system can receive obfuscated code 202, as described above in reference to FIG. 1.

The client system can execute the obfuscated code 202 in a code execution environment 204. In some implementations, the code execution environment 204 is a virtual machine environment. When executed, the obfuscated code 202 can generate an obfuscated stack trace 205. The error handling code can generate the obfuscated stack trace 205 as a result of an error, or a user of the client system can deliberately generate the stack trace, e.g., by issuing error logging commands.

The obfuscated code 202 can also be processed by a code analyzer 208. The code analyzer 208 can identify properties of the obfuscated code 202, and the properties can be used to generate a signature, which will be described in more detail below. The properties can include at least one or more of the following: a number of classes in the code, a number of methods in each class, a number of methods in all classes, a number of parameters in the methods, a number of variables, e.g., static variables, and constants, e.g., string constants, in the classes and the methods, a number of qualifiers, and a number of fields. In some implementations, the properties include argument types and return types. Examples of properties identified by the code analyzer 208 will be described below in reference to FIG. 5.

The code analyzer 208 can send the properties to a signature generator 210. The signature generator 210 can generate signatures for methods and classes in the obfuscated code 202. This will be described further below in reference to FIGS. 4 and 5.

The signature generator 210 can send the signatures to the hash generator 206. The hash generator 206 can generate a sequence of terms, e.g., a mnemonic stack-trace hash 212, in a natural language 206 from the signatures and the obfuscated stack trace 205. The hash generator 206 can send the mnemonic stack-trace hash 212 to a vendor system, e.g., vendor system 104 of FIG. 1. This will be described further below in reference to FIG. 4.

In some implementations, the hash generator 206 applies a cryptographic hash function, e.g., SHA-1, to a particular signature, and generates the mnemonic stack-trace hash 212 from the cryptographic hash, which will be described further below with reference to FIG. 4.

Although generating signatures and hashes have been described to be implemented on a client system, they can also be implemented on a vendor system, e.g., vendor system 104 of FIG. 1.

Figure 3:
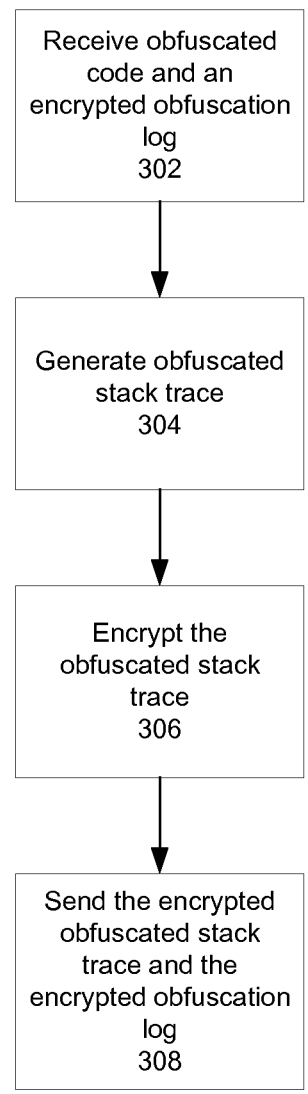
FIG. 3 is a flow diagram of an example method for processing obfuscated code and an obfuscation log from a vendor system.

FIG. 3 is a flow diagram of an example method for processing obfuscated code and an obfuscation log from a vendor system. For convenience, the method will be described with respect to a system, e.g., the client system 102 of FIG. 1, having one or more computing devices that execute software to implement the method.

The system receives obfuscated code (step 302) from a vendor system, e.g., from the vendor system 104 of FIG. 1. The obfuscated code can be executed at the client system to generate an obfuscated stack trace (step 304). The stack trace can have obfuscated code element names, as described above in reference to FIG. 1. In some implementations, the system encrypts the obfuscated stack trace using a public key received from the vendor system (step 306).

The system also receives an encrypted obfuscation log from the vendor system (step 302), as described above in reference to FIG. 1. In some implementations, the system receives a package including the obfuscated code and the obfuscation log. The obfuscation log can be associated with the obfuscated code. For example, the vendor system can generate the obfuscation log in response to obfuscating the code. The system can then send the encrypted obfuscated stack trace along with the encrypted obfuscation log to the vendor system (step 308). The vendor system can decrypt the encrypted obfuscated stack trace and the encrypted obfuscation log using a private key. The decrypted obfuscation log can be used to deobfuscate the obfuscated stack trace, e.g., by mapping obfuscated element names to deobfuscated element names. Therefore, the deobfuscated stack trace can have deobfuscated code element names.

In some implementations, the obfuscation log remains with the vendor system. That is, each version of the obfuscated code can have a corresponding obfuscation log, which can be stored at the vendor system, e.g., in a database. The obfuscated code can be sent to the client system, which generates an obfuscated stack trace to be sent to the vendor system. The vendor system can, upon receiving the obfuscated stack trace from the client system, retrieve the corresponding obfuscation log to deobfuscate the stack trace.

From a user perspective, a user can be presented with only a dialog box requesting the user to send an error report. In response to receiving user input to send the error report, the system can receive obfuscated code and an encrypted obfuscation log, and generate and encrypt an obfuscated stack trace using the encrypted obfuscation log, as described above.

Figure 4:
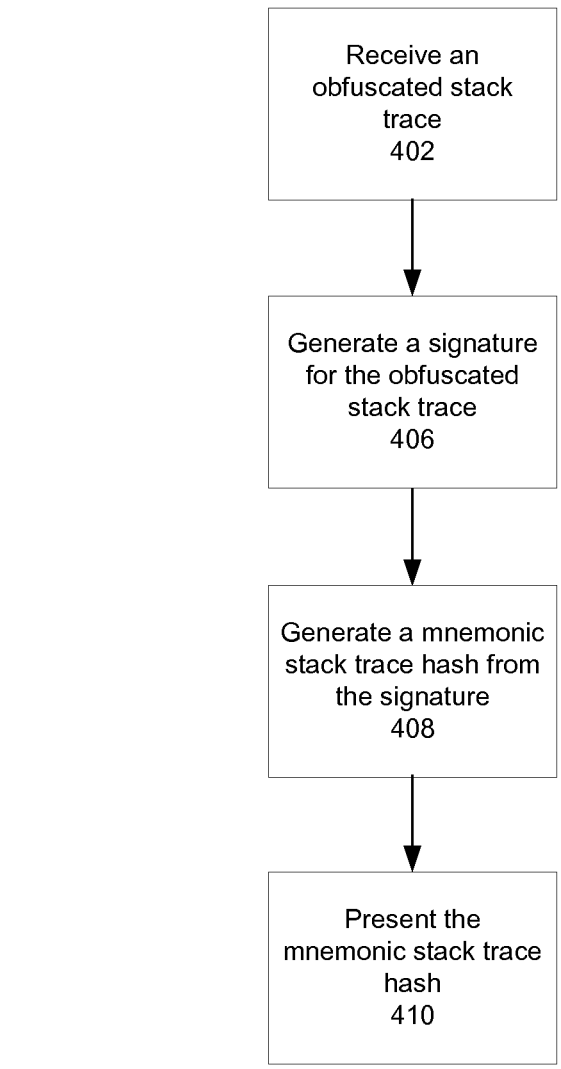
FIG. 4 is a flow diagram of an example method for generating a sequence of terms in a natural language from an obfuscated stack trace.

FIG. 4 is a flow diagram of an example method for generating a mnemonic stack-trace hash from an obfuscated stack trace. For convenience, the method will be described as being performed by an appropriately programmed system of one or more computers, e.g., the client system 102 of FIG. 1.

The system receives an obfuscated stack trace (step 402). In some implementations, error handling code of obfuscated code generates the obfuscated stack trace.

The system generates a signature for the obfuscated stack trace (step 406). Generating the signature will be described further below in reference to FIG. 5.

The system generates a hash from the signature. In some implementations, the system applies a cryptographic hash function, e.g., SHA-1, to the signature.

The system generates a mnemonic stack-trace hash from the cryptographic hash or directly from the signature (step 408). The mnemonic stack-trace hash is a sequence of terms in a natural language, which can aid a user in remembering this particular stack trace.

In some implementations, the terms in the sequence are selected from a fixed number of categories. Each category can have a list of single words related to the category. The single words can be sorted alphabetically in an array. The list of words can be predetermined. For example, a first category can include words of colors, e.g., 'red' or 'blue', and a second category can include nouns, e.g., 'hunter' or 'climber'. The sequence of terms can be a concatenation of single words selected from each category.

Each of the words can start with different initial letters to aid the uniqueness and distinctiveness of the words. The categories can also be chosen to resonate with different cognitive aspects. For example, words in the categories can be adjectives of a visceral or moralistic nature, colors, animate entities, e.g., animals or fictional beings, compatible nouns of a vivid nature such as 'blender' or 'nostril.'

To generate the sequence of terms, the system can split the hash into a number of segments. The number of segments can match the number of fixed categories. Each segment can represent a portion of the hash. For example, if the hash is 'aaf4c61ddcc5e8a2dabede0f3b482cd9aea9434d' and there are four categories, the system can split the hash into four segments—'aaf4c61ddc', 'c5e8a2dabe', 'de0f3b482c', and 'd9aea9434d'. Each segment can have a numerical value. For example, segment 'aaf4c61ddc' can interpreted as an integer to obtain the numerical value.

For each category, the system can select a single word from the category based on a respective segment value. Each category can correspond to a respective array of words. In some implementations, the system calculates a remainder after division of the segment value with the number of words in the corresponding category, and the system uses the remainder as an index to select a particular word from the corresponding category. For example, segment 'c5e8a2dabe,' when interpreted as a hexadecimal number has a value of 850011544254. To represent this segment, the system can select the fifth element of a first category having 23 words, since 850011544254 modulo 23=5. After selecting each word for each segment value, the system can generate a sequence of terms from the selected words.

The system can store the sequence of terms in a database of generated sequences of terms.

The system presents the sequence of terms in the natural language (step 410). The system can present the sequence of terms in a user interface that displays a number of occurrences of all sequences of terms generated by the system. In some implementations, the user interface displays a number of occurrences of sequences of terms within a particular time period. This can help a developer quickly identify bugs in the code that cause the stack trace to be generated.

In some implementations, the system generates a notification from the sequence of terms, which will be described below in reference to FIG. 6.

In some implementations, even if the system receives updated code having different obfuscated code, the hash, and therefore the sequence of terms, can be unchanged, as will be described below in reference to FIG. 5.

FIG. 5 is an illustration of example code 500 used to generate a signature for a stack trace. In general, the signature can be generated from properties of code element names identified in the stack trace.

As described above in reference to FIG. 2, a client system can receive obfuscated code, which, when executed, can generate an obfuscated stack trace. The obfuscated code can include multiple obfuscated classes and multiple obfuscated methods within each class. For example, the example code 500 describes a sample obfuscated class 502 named Class_a. The obfuscated class 502 includes obfuscated variables 504 and obfuscated methods 506 and 508.

The client system can analyze, e.g., using code analyzer 208 of FIG. 2, the obfuscated code to identify a number of properties for each class. For example, a code analyzer can identify how many methods and how many class parameters are in the obfuscated class 502. Other types of identifiable properties are described above in reference to FIG. 2.

The system generates a signature for each stack trace to which it is applied. The signature is a string that should be unique to each particular stack trace with very high probability, so that it can be used to produce a unique hash with very high probability. This is achieved by concatenating various information derived from the stack trace to form the signature.

In some implementations, the system generates a signature for each of the classes. The signature can be the concatenation of (i) a fixed string such as 'class' (note that the name of the class is normally not used, since that would introduce obfuscation-affected information), followed by (ii) the qualifiers associated with the class, e.g., 'public', 'private', 'abstract', etc., followed by (iii) a fixed string such as 'methods', followed by (iv) the number of methods in the class represented in ASCII, followed by (v) a concatenation of the qualifiers associated with each method of the class, e.g., 'private', 'public', 'static' etc., followed by (vi) a fixed string such as 'fields', followed by (vii) the number of fields and their qualifiers, as for methods. The elements in this concatenation are separated by characters such as '_', introduced to prevent ambiguity as to which field in the sequence a given qualifier applies to. For example, obfuscated class 502 can include 20 methods, and therefore, a signature of the obfuscated class 502 can be 'class_2_public_methods_2_private_public_fields_4'.

The system can also generate a method signature for each method in the class. For example, method 506 has two parameters. The signature for method 506 can be 'private_2'. In some implementations, the system includes the signatures for the types associated with a method. The types can include a return type, e.g., a void, primitive, or class return type, and argument types. This can be achieved by numbering the returning type 0, and each parameter type incrementally from 1. Each primitive type such as int or String can be appended into the signature for the method by hard-coding string representations of each primitive type. For example, the signature for method 506 can be 'private_2_1_int_2_int' and the signature for method 508 can be 'public_1_0_void'.

In some implementations, after generating method signatures for each method and a class signature, the system generates a refined method signature for each method. The refined method signature can be based on the previously generated method signature and a signature of the class including the method, and the non-primitive types involved in the method signature. For example, the system can concatenate the previously generated method signature, e.g., for method 506 'private_2_1_int_2_in' followed by the signature of the class, e.g., 'class_2_public_methods_2_private_public_fields_4_', followed by the class signatures for each non-primitive argument (or return) type along with the number indicating which argument it is, or that it is the return type, e.g., method 506 returns the type Class_b so '0_X' should be concatenated (where X is replaced by the signature for Class_b computed as for Class_a).

In some implementations, after generating refined method signatures for each method, the system generates a refined class signature for each class by concatenating the refined method signatures for each of its methods to its class signature. This process can be repeated in a mutually recursive manner to generate a 2nd degree refinement of a method signature by concatenating the refined signatures of each class with which it is related (e.g., its containing class, and the classes involved as return or parameter types). 2nd degree refinement of class signatures is achieved by concatenating 2nd degree refined method signatures exactly as for the first degree of refinement. There is no limit to the number of times such refinement can be performed. The greater the number of refinements the more unlikely it is for different methods or classes to end up having identical signatures, and hence the more unlikely it is that different stack traces yield the same hashed signature. On the other hand, the greater the degree of refinement, the more likely it is that minor changes to the source induce different signatures for the same stack traces. It is generally desirable as a second priority for minor changes not to affect the stack trace hashes for unrelated source code, since it allows the stack trace hashes to correlate across different versions of the same software.

The system can then generate a stack trace signature based on the refined method signatures and the obfuscated stack trace. For example, the obfuscated stack trace includes references to methods in the obfuscated code. Because each method has a refined method signature, the system can combine, e.g., concatenate, refined method signatures of methods referenced in the obfuscated stack trace, and generate a stack trace signature, e.g., a hash, from the combined refined method signatures. The signatures do not reference code element names, and thus are not affected by obfuscation.

The stack trace signature can be used to generate the hash, which is used to generate a sequence of terms, as described above in reference to FIG. 4.

In some implementations, the stack trace signature is also based on a refined class signature. The stack trace can include one or more classes at which an error occurs. The system can generate a respective refined class signature for each class in the stack trace. The refined class signature can be based on refined method signatures of methods within the class. For example, the system can combine, e.g., concatenate, values corresponding to properties of the class with each associated refined method signature, and then the system can generate a refined class signature from the combination. The stack trace signature can be generated from a combination of each refined method signature of methods referenced in the stack trace and the refined class signature of classes referenced in the stack trace.

In some implementations, when generating signatures for a particular method, either the signatures or hashes of the signatures can be cached when first computed so that they need not be computed every time. To this end, when generating the refined method signature for a method with a return type associated with any cached hashes of signatures, the system can generate a hash for the refined method signature and append the cached hashes of the refinements to the generated hash.

Figure 6:
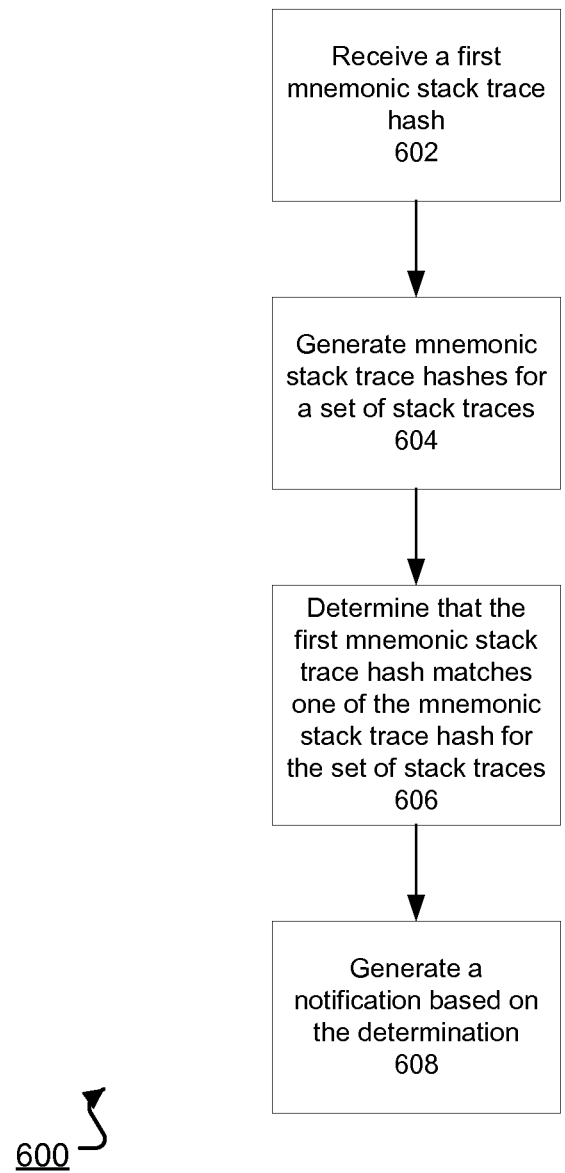
FIG. 6 is a flow diagram of an example method for generating a notification based on a sequence of terms.

FIG. 6 is a flow diagram of an example method for generating a notification based on a previously encountered mnemonic stack-trace hash. For convenience, the method will be described as being performed by an appropriately programmed system of one or more computers, e.g., the client system 102 of FIG. 1.

The system receives a first mnemonic stack-trace hash (step 602). The mnemonic stack-trace hash is a sequence of terms in a natural language. The system can receive the first mnemonic stack-trace hash from a hash generator, e.g., the hash generator 206 of FIG. 2, which generated the first mnemonic stack-trace hash from an obfuscated stack trace outputted by executing obfuscated code. The first mnemonic stack-trace hash can also be received from another system that executed a different version of the obfuscated code.

The system generates mnemonic stack-trace hashes for a set of stack traces (step 604). In some implementations, the mnemonic stack-trace hashes have already been generated and stored in a database, and the system retrieves the mnemonic stack-trace hashes from a database. The set of stack traces can correspond to known bugs that occur in code executed at the system. The set of stack traces can be stored at the system or in an external database. The system can use the hash generator to generate a mnemonic stack-trace hash for each stack trace. Each stack trace can be generated from a different iteration of obfuscated code. In some implementations, the system generates a mnemonic stack-trace hash to be stored immediately after generating a respective stack trace. In some implementations, the system stores how many times a mnemonic stack-trace hash is generated.

The system determines that the first mnemonic stack-trace hash matches one of the mnemonic stack-trace hash for the set of stack traces (step 606). The system can compare the first mnemonic stack-trace hash with each mnemonic stack-trace hash generated from the set of stack traces. If there is a match, the system can increment a count of occurrences of the first mnemonic stack-trace hash.

The system can generate a notification based on the determination (step 608). If there is not a match, the system can store the occurrence of the first mnemonic stack-trace hash, e.g., in a database. If there is a match, the system can generate a notification indicating a number of occurrences of the first mnemonic stack-trace hashes.

The notification can include the stack trace corresponding to the mnemonic stack-trace hash, a number of occurrences of the mnemonic stack-trace hash, or a timestamp of the most recent occurrence. The notification can also include a list of other mnemonic stack-trace hashes and their corresponding number of occurrences. In some implementations, the system automatically sends the notification to a code repository system, which generates a bug report from the notification.

In some implementations, the system identifies a particular recipient of the notification. Because multiple developers can manage the set of stack traces, identifying the particular recipient responsible for a particular bug corresponding to the mnemonic stack-trace hash can expedite development.

The system can communicate with a database that associates developer contact information with mnemonic stack traces. For example, Developer A can be responsible for all occurrences of the mnemonic stack-trace hash: "Red-Hunter". Therefore, the database can store an entry that associates Developer A's contact information, e.g., email or phone number, with "Red-Hunter".

The system can determine whether the mnemonic stack-trace hash in the notification is associated with a particular developer. If it is, the system can contact the particular developer.

The notification can also be sent to a client system, e.g., the client system 102 of FIG. 1, executing the obfuscated code. In some implementations, the notification can be processed by the obfuscated code to cause the client system to display a user interface including the notification. The user interface can include fields for user input that prompt a user of the client system to provide circumstances that may have caused the error. Once the user enters user input into the fields, the client system can submit the user input to a developer.

In some implementations, receiving the notification causes the client system to generate an error report to be sent to the developer of the code. The error report can include a hardware and software profile of the client system, and a version number of the code.

In some implementations, the client system retrieves generated mnemonic stack trace hashes from a database. When executing the obfuscated code, the client system can count identical bugs referenced by respective mnemonic stack trace hashes and prevent the identical bugs from spamming log files or prompting a user to submit a bug report.

In some other implementations, a user can associate each mnemonic stack trace hash with a severity level. When executing the obfuscated code, the client system can suppress reporting of known bugs associated with mnemonic stack trace hashes with a low severity level.

In yet some other implementations, each mnemonic stack trace hash can be used as a key to retrieve user feedback. That is, when a user submits an error report for a particular mnemonic stack trace hash, the error report can be stored with the mnemonic stack trace hash. The error reports can be aggregated into a profile, and other developers can retrieve the profile associated with the mnemonic stack trace hash for improved debugging. In some implementations, the mnemonic stack trace hash can be used as a name for the profile so users can easily find or group bug report files.

In yet some other implementations, a client system can maintain a list of mnemonic stack trace hashes for each version of code. Because usually a small portion of code is changed with every new version, the client system can track how many mnemonic stack trace hashes change based on the changed portion of code. The number of mnemonic stack trace hash changes indicates a number of methods or classes that use the changed portion of code to generate respective mnemonic stack trace hashes. In this situation, a large number of hash changes may be undesirable because only a small portion of code was changed while a developer may interpret the large number of hash changes to mean a large portion of code was changed. Therefore, the number of mnemonic stack trace hash changes can inform the client system as to how many degrees of refinement the mnemonic stack trace hash should be based upon. For example, if a code change to one method causes many mnemonic stack trace hashes to change, the client system can decrease how many degrees of refinement will be used to calculate future mnemonic stack trace hashes of the method. The number of mnemonic stack trace hash changes can also indicate how many mnemonic stack trace hashes are rendered obsolete from the small changed portion of code. The changes can be tracked by the maintained list, thereby allowing a developer to refer to current and past mnemonic stack trace hashes, e.g., for debugging.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   obtaining, by a user device, an obfuscated stack trace representing a first error generated by error handling code of obfuscated code executed by the user device, the obfuscated stack trace having obfuscated code element names corresponding to deobfuscated code element names in a deobfuscated version of the obfuscated code;
   generating, by the user device, a first signature for the obfuscated stack trace based on one or more properties of obfuscated code elements referenced by the obfuscated stack trace;
   generating, by the user device, a first mnemonic stack-trace hash from the first signature for the obfuscated stack trace;
   providing, by the user device to a vendor computer system, the first mnemonic stack-trace hash generated from the obfuscated stack trace;

obtaining, by the vendor computer system, a deobfuscated stack trace representing a second error generated by error handling code of the deobfuscated version of the obfuscated code, the deobfuscated stack trace having deobfuscated code element names;

generating, by the vendor computer system, a second signature for a deobfuscated stack trace based on one or more properties of deobfuscated code elements referenced by the deobfuscated stack trace;

generating, by the vendor computer system, a second mnemonic stack-trace hash from the second signature for the deobfuscated stack trace;

comparing, by the vendor computer system, the first mnemonic stack-trace hash to the second mnemonic stack-trace hash;

determining, by the vendor computer system, that the first mnemonic stack-trace hash and the second mnemonic stack-trace hash are the same; and in response to determining that the first mnemonic stack-trace hash and the second mnemonic stack-trace hash are the same, generating an automatic notification indicating that the first error and the second error are the same.

2. The method of claim 1, wherein the obfuscated code is generated by an obfuscator that generates different code element names each time the obfuscator is run.

3. The method of claim 1, wherein the automatic notification includes the first mnemonic stack-trace hash or the second mnemonic stack-trace hash, and further comprising:

identifying, from a database that associates mnemonic stack-trace hashes with respective developer contact information, particular developer contact information associated with the first mnemonic stack-trace hash or the second mnemonic stack-trace hash in the database; and directing the automatic notification based on the particular developer contact information.

4. The method of claim 1, further comprising:

sending, by the vendor computer system, the automatic notification to the user device, the automatic notification comprising executable instructions that cause the user device to display a user interface including the automatic notification.

5. A computer-implemented method comprising:

receiving, by error handling code of a project having obfuscated code being executed by a user device, an obfuscated stack trace, the obfuscated stack trace having obfuscated code element names;

generating, by the user device, a stack-trace signature for the obfuscated stack trace based on one or more properties of obfuscated code elements referenced by the obfuscated stack trace, including:

generating, for each class of one or more classes referenced by the obfuscated stack trace, a respective class signature based at least on a number of methods in the class, generating, for each method of one or more methods of one or more classes referenced by the obfuscated stack trace, a respective method signature based at least on a number of parameters to the method, generating, for each method of one or more methods referenced by the obfuscated stack trace, a respective refined method signature based at least on a respective method signature for the method and a respective class signature for a class of the method, and generating the stack-trace signature for the obfuscated stack trace based at least on one or more refined method signatures of the one or more methods identified in the obfuscated stack trace;

generating, by the user device, a mnemonic stack-trace hash from the stack-trace signature for the obfuscated stack trace, the mnemonic stack-trace hash being a sequence of terms in a natural language; and presenting, by the user device to a user of the user device, the mnemonic stack-trace hash as being representative of an error corresponding to the obfuscated stack trace.

6. The method of claim 5, further comprising generating, for each class of one or more classes referenced by the obfuscated stack trace, a respective refined class signature based at least on respective refined method signatures of one or more methods within the class and the respective class signature for the class, and wherein the stack-trace signature is based at least on the respective refined class signatures of the one or more classes referenced by the obfuscated stack trace.

7. The method of claim 5, wherein generating, for each method of one or more methods of one or more classes referenced by the obfuscated stack trace, a respective method signature comprises generating the method signature based on a return type or argument types associated with the method.

8. The method of claim 7, wherein the return type for each of the one or more methods is one of the following: a void return type, a primitive return type, or a class return type.

9. The method of claim 5, wherein generating, for each method of one or more methods referenced by the obfuscated stack trace, the respective refined method signature comprises concatenating the respective method signature for the method and the respective class signature for a class of the method.

10. The method of claim 5, wherein each class signature is based at least on one or more of the following properties in the respective class: a number of fields, a number of qualifiers, a number of static variables, and a number of string constants.

11. The method of claim 5, wherein generating the mnemonic stack-trace hash comprises:

identifying a fixed number of categories, each category comprising a plurality of distinct single words;

generating a cryptographic hash from the signature for the obfuscated stack trace;

generating a number of segments from the cryptographic hash, the number of segments equal to the fixed number of categories, each segment having a value corresponding to a respective category;

selecting a single word from each category based on the respective segment value; and generating the mnemonic stack-trace hash based at least on the selected single word from each category.

12. The method of claim 5, further comprising:

comparing the mnemonic stack-trace hash with previously stored mnemonic stack-trace hashes that are each representative of previously occurring errors; and generating an automatic notification whenever the mnemonic stack-trace hash matches any of the previously stored mnemonic stack-trace hashes.

13. The method of claim 5, wherein generating the stack-trace signature for the obfuscated stack trace comprises generating the stack-trace signature without having access to a deobfuscated stack trace having deobfuscated code element names.

14. The method of claim 5, wherein generating the stack-trace signature for the obfuscated stack trace comprises generating the stack-trace signature without having access to deobfuscated code element names.

15. The method of claim 1, further comprising storing the second mnemonic stack-trace hash in a database of known bugs for the obfuscated code; and
wherein comparing, by the vendor computer system, the first mnemonic stack-trace hash to the second mnemonic stack-trace hash comprises comparing the first mnemonic stack-trace hash to a plurality of other mnemonic stack-trace hashes in the database of known bugs for the obfuscated code.

16. A computer-implemented method comprising:
receiving, by error handling code of a project having obfuscated code being executed by a user device, an obfuscated stack trace, the obfuscated stack trace having obfuscated code element names;
generating, by the user device, a signature for the obfuscated stack trace based on one or more properties of obfuscated code elements referenced by the obfuscated stack trace;
generating, by the user device, a mnemonic stack-trace hash from the signature for the obfuscated stack trace, the mnemonic stack-trace hash being a sequence of terms in a natural language, including:
identifying a fixed number of categories, each category comprising a plurality of distinct single words;
generating a cryptographic hash from the signature for the obfuscated stack trace;
generating a number of segments from the cryptographic hash, the number of segments being equal to the fixed number of categories, each segment having a value corresponding to a respective category;
selecting a single word from each category based on the respective segment value; and
generating the mnemonic stack-trace hash for the obfuscated stack trace based at least on the selected single word from each category; and
presenting, by the user device to a user of the user device, the mnemonic stack-trace hash for the obfuscated stack trace as being representative of an error corresponding to the obfuscated stack trace.

17. One or more non-transitory computer storage media encoded with computer program instructions that when executed by computers of a computer system comprising a vendor system and a user device, cause the computers of the computer system to perform operations comprising:
obtaining, by the user device, an obfuscated stack trace representing a first error generated by error handling code of obfuscated code executed by the user device, the obfuscated stack trace having obfuscated code element names corresponding to deobfuscated code element names in a deobfuscated version of the obfuscated code;
generating, by the user device, a first signature for the obfuscated stack trace based on one or more properties of obfuscated code elements referenced by the obfuscated stack trace;
generating, by the user device, a first mnemonic stack-trace hash from the first signature for the obfuscated stack trace;
providing, by the user device to a vendor computer system, the first mnemonic stack-trace hash generated from the obfuscated stack trace;
obtaining, by the vendor system, a deobfuscated stack trace representing a second error generated by error handling code of the deobfuscated version of the obfuscated code, the deobfuscated stack trace having deobfuscated code element names;
generating, by the vendor system, a second signature for a deobfuscated stack trace based on one or more properties of deobfuscated code elements referenced by the deobfuscated stack trace;
generating, by the vendor system, a second mnemonic stack-trace hash from the second signature for the deobfuscated stack trace;
comparing, by the vendor system, the first mnemonic stack-trace hash to the second mnemonic stack-trace hash;
determining, by the vendor system, that the first mnemonic stack-trace hash and the second mnemonic stack-trace hash are the same; and
in response to determining that the first mnemonic stack-trace hash and the second mnemonic stack-trace hash are the same, generating an automatic notification indicating that the first error and the second error are the same.

18. The one or more non-transitory computer storage media of claim 17, wherein the automatic notification includes the first or the second mnemonic stack-trace hash, and further comprising:
identifying, from a database that associates developer contact information with mnemonic stack-trace hashes, a developer contact corresponding to the first or the second mnemonic stack-trace hash; and
directing the automatic notification based on the developer contact information.

19. The one or more non-transitory computer storage media of claim 17, wherein the operations further comprise:
sending, by the vendor system, the automatic notification to the user device, the automatic notification comprising executable instructions that cause the user device to display a user interface including the automatic notification.

20. The one or more non-transitory computer storage media of claim 17, wherein the operations further comprise storing the second mnemonic stack-trace hash in a database of known bugs for the obfuscated code; and
wherein comparing, by the vendor system, the first mnemonic stack-trace hash to the second mnemonic stack-trace hash comprises comparing the first mnemonic stack-trace hash to a plurality of other mnemonic stack-trace hashes in the database of known bugs for the obfuscated code.

21. A system comprising:
one or more computers and one or more storage devices storing instructions that are operable, when executed by the one or more computers, to cause the one or more computers to perform operations comprising:
obtaining, by a user device, an obfuscated stack trace representing a first error generated by error handling code of obfuscated code executed by the user device, the obfuscated stack trace having obfuscated code element names corresponding to deobfuscated code element names in a deobfuscated version of the obfuscated code;
generating, by the user device, a first signature for the obfuscated stack trace based on one or more properties of obfuscated code elements referenced by the obfuscated stack trace;
generating, by the user device, a first mnemonic stack-trace hash from the first signature for the obfuscated stack trace;

providing, by the user device to a vendor computer system, the first mnemonic stack-trace hash generated from the obfuscated stack trace;

obtaining, by the vendor computer system, a deobfuscated stack trace representing a second error generated by error handling code of the deobfuscated version of the obfuscated code, the deobfuscated stack trace having deobfuscated code element names;

generating, by the vendor computer system, a second signature for a deobfuscated stack trace based on one or more properties of deobfuscated code elements referenced by the deobfuscated stack trace;

generating, by the vendor computer system, a second mnemonic stack-trace hash from the second signature for the deobfuscated stack trace;

comparing, by the vendor computer system, the first mnemonic stack-trace hash to the second mnemonic stack-trace hash;

determining, by the vendor computer system, that the first mnemonic stack-trace hash and the second mnemonic stack-trace hash are the same; and in response to determining that the first mnemonic stack-trace hash and the second mnemonic stack-trace hash are the same, generating an automatic notification indicating that the first error and the second error are the same.

22. A computer program product, encoded on one or more non-transitory computer storage media, comprising instructions that when executed by one or more computers cause the one or more computers to perform operations comprising:

receiving, by error handling code of a project having obfuscated code being executed by a user device, an obfuscated stack trace, the obfuscated stack trace having obfuscated code element names;

generating, by the user device, a stack-trace signature for the obfuscated stack trace based on one or more properties of obfuscated code elements referenced by the obfuscated stack trace, including:

generating, for each class of one or more classes referenced by the obfuscated stack trace, a respective class signature based at least on a number of methods in the class, generating, for each method of one or more methods of one or more classes referenced by the obfuscated stack trace, a respective method signature based at least on a number of parameters to the method, generating, for each method of one or more methods referenced by the obfuscated stack trace, a respective refined method signature based at least on a respective method signature for the method and a respective class signature for a class of the method, and generating the stack-trace signature for the obfuscated stack trace based at least on one or more refined method signatures of the one or more methods identified in the obfuscated stack trace;

generating, by the user device, a mnemonic stack-trace hash from the stack-trace signature for the obfuscated stack trace, the mnemonic stack-trace hash being a sequence of terms in a natural language; and presenting, by the user device to a user of the user device, the mnemonic stack-trace hash as being representative of an error corresponding to the obfuscated stack trace.

23. The computer program product of claim 22, wherein the operations further comprise generating, for each class of one or more classes referenced by the obfuscated stack trace, a respective refined class signature based at least on respective refined method signatures of one or more methods within the class and the respective class signature for the class, and wherein the stack-trace signature is based at least on the respective refined class signatures of the one or more classes referenced by the obfuscated stack trace.

24. The computer program product of claim 22, wherein generating, for each method of one or more methods of one or more classes referenced by the obfuscated stack trace, a respective method signature comprises generating the method signature based on a return type or argument types associated with the method.

25. The computer program product of claim 24, wherein the return type for each of the one or more methods is one of the following: a void return type, a primitive return type, or a class return type.

26. The computer program product of claim 22, wherein generating, for each method of one or more methods referenced by the obfuscated stack trace, the respective refined method signature comprises concatenating the respective method signature for the method and the respective class signature for a class of the method.

27. The computer program product of claim 22, wherein each class signature is based at least on one or more of the following properties in the respective class: a number of fields, a number of qualifiers, a number of static variables, and a number of string constants.

28. The computer program product of claim 22, wherein generating the mnemonic stack-trace hash comprises:

identifying a fixed number of categories, each category comprising a plurality of distinct single words;

generating a cryptographic hash from the signature for the obfuscated stack trace;

generating a number of segments from the cryptographic hash, the number of segments equal to the fixed number of categories, each segment having a value corresponding to a respective category;

selecting a single word from each category based on the respective segment value; and generating the mnemonic stack-trace hash based at least on the selected single word from each category.

29. The computer program product of claim 22, wherein the operations further comprise:

comparing the mnemonic stack-trace hash with previously stored mnemonic stack-trace hashes that are each representative of previously occurring errors; and generating an automatic notification whenever the mnemonic stack-trace hash matches any of the previously stored mnemonic stack-trace hashes.

30. The computer program product of claim 22, wherein generating the stack-trace signature for the obfuscated stack trace comprises generating the stack-trace signature without having access to a deobfuscated stack trace having deobfuscated code element names.

31. The computer program product of claim 22, wherein generating the stack-trace signature for the obfuscated stack trace comprises generating the stack-trace signature without having access to deobfuscated code element names.

32. A system comprising:

one or more computers and one or more storage devices storing instructions that are operable, when executed by the one or more computers, to cause the one or more computers to perform operations comprising:

receiving, by error handling code of a project having obfuscated code being executed by a user device, an obfuscated stack trace, the obfuscated stack trace having obfuscated code element names;

generating, by the user device, a stack-trace signature for the obfuscated stack trace based on one or more properties of obfuscated code elements referenced by the obfuscated stack trace, including:
  generating, for each class of one or more classes referenced by the obfuscated stack trace, a respective class signature based at least on a number of methods in the class,
  generating, for each method of one or more methods of one or more classes referenced by the obfuscated stack trace, a respective method signature based at least on a number of parameters to the method,
  generating, for each method of one or more methods referenced by the obfuscated stack trace, a respective refined method signature based at least on a respective method signature for the method and a respective class signature for a class of the method, and
  generating the stack-trace signature for the obfuscated stack trace based at least on one or more refined method signatures of the one or more methods identified in the obfuscated stack trace;
generating, by the user device, a mnemonic stack-trace hash from the stack-trace signature for the obfuscated stack trace, the mnemonic stack-trace hash being a sequence of terms in a natural language; and
presenting, by the user device to a user of the user device, the mnemonic stack-trace hash as being representative of an error corresponding to the obfuscated stack trace.

33. A computer program product, encoded on one or more non-transitory computer storage media, comprising instructions that when executed by one or more computers cause the one or more computers to perform operations comprising:
  receiving, by error handling code of a project having obfuscated code being executed by a user device, an obfuscated stack trace, the obfuscated stack trace having obfuscated code element names;
  generating, by the user device, a signature for the obfuscated stack trace based on one or more properties of obfuscated code elements referenced by the obfuscated stack trace;
  generating, by the user device, a mnemonic stack-trace hash from the signature for the obfuscated stack trace, the mnemonic stack-trace hash being a sequence of terms in a natural language, including:
    identifying a fixed number of categories, each category comprising a plurality of distinct single words;
    generating a cryptographic hash from the signature for the obfuscated stack trace;
    generating a number of segments from the cryptographic hash, the number of segments being equal to the fixed number of categories, each segment having a value corresponding to a respective category;
    selecting a single word from each category based on the respective segment value; and
    generating the mnemonic stack-trace hash for the obfuscated stack trace based at least on the selected single word from each category; and
  presenting, by the user device to a user of the user device, the mnemonic stack-trace hash for the obfuscated stack trace as being representative of an error corresponding to the obfuscated stack trace.

34. A system comprising:
one or more computers and one or more storage devices storing instructions that are operable, when executed by the one or more computers, to cause the one or more computers to perform operations comprising:
  receiving, by error handling code of a project having obfuscated code being executed by a user device, an obfuscated stack trace, the obfuscated stack trace having obfuscated code element names;
  generating, by the user device, a signature for the obfuscated stack trace based on one or more properties of obfuscated code elements referenced by the obfuscated stack trace;
  generating, by the user device, a mnemonic stack-trace hash from the signature for the obfuscated stack trace, the mnemonic stack-trace hash being a sequence of terms in a natural language, including:
    identifying a fixed number of categories, each category comprising a plurality of distinct single words;
    generating a cryptographic hash from the signature for the obfuscated stack trace;
    generating a number of segments from the cryptographic hash, the number of segments being equal to the fixed number of categories, each segment having a value corresponding to a respective category;
    selecting a single word from each category based on the respective segment value; and
    generating the mnemonic stack-trace hash for the obfuscated stack trace based at least on the selected single word from each category; and
  presenting, by the user device to a user of the user device, the mnemonic stack-trace hash for the obfuscated stack trace as being representative of an error corresponding to the obfuscated stack trace.

* * * * *